Patented May 18, 1937

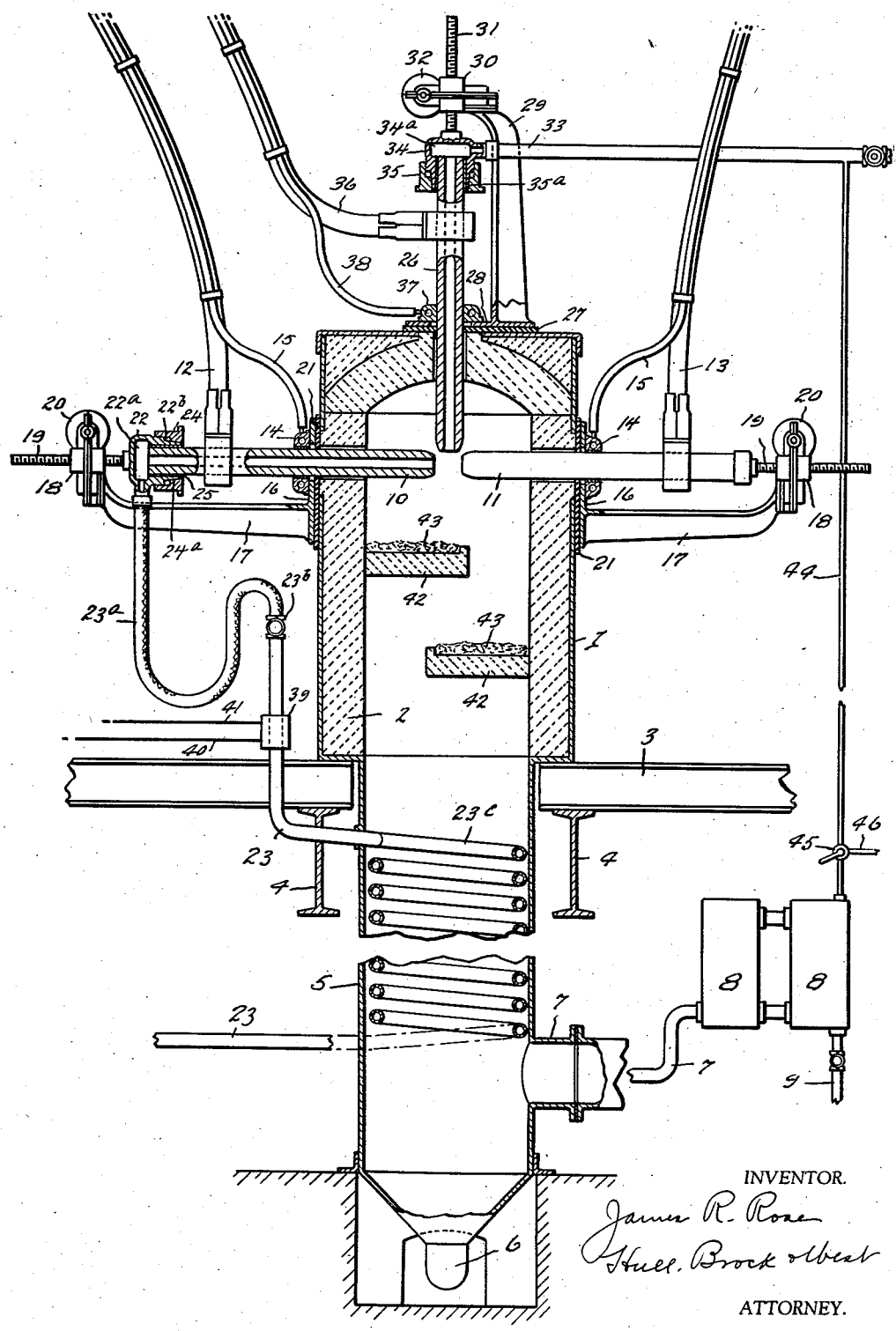

2,080,929

UNITED STATES PATENT OFFICE 2,080,929

PROCESS OF TREATING HYDROCARBON FLUIDS

James R. Rose, Edgeworth, Pa., assignor of three-fourths to Michael L. Benedum and Joseph C. Trees, both of Pittsburgh, Pa., Application December 20, 1935, Serial No. 55,387

5 Claims. (Cl. 204—31)

This invention relates to a process of treating fluids consisting principally of aliphatic hydrocarbons for the production of valuable products therefrom. A field wherein my process is of particular importance is the production of benzene from hydrocarbon fluids, including natural gas or methane.

In my Patent No. 1,339,225, I describe and claim a process for manufacturing a gaseous fuel containing gases of the $CH_4$ and $C_6H_6$ series by subjecting methane or natural gas to the heat of an electric arc formed between carbon electrodes. The present process contemplates such improvements over the process described and claimed in the aforesaid patent as will enable me to produce, for instance, substantially pure benzene in a particularly economical and efficient manner.

I realize my process by the apparatus shown in the drawing hereof, wherein the view shows in vertical section a furnace or reaction chamber equipped for the production of benzene from hydrocarbon fluids and, on a reduced scale, a diagrammatic illustration of an apparatus for separating and absorbing a heavy hydrocarbon, such as benzene, whereby it may be recovered as a liquid.

Describing the apparatus by reference characters, 1 denotes the outer metallic wall of the upper section of an electric furnace or reaction chamber, having therein a lining 2, preferably of carbon blocks. This upper section is shown as resting on any suitable support, as the beams 3 and 4, with a lower extension 5 having at the bottom an offtake connection 6 for the removal of carbon or other non-volatile or non-gaseous material. From the lower section 5 there extends an offtake 7 for the gaseous mixture produced within the furnace, which gaseous mixture is conveyed to separators and recovered as a liquid and from which it can be drawn off. The apparatus used for separating the carbon from the gases and for the purification of gases and the absorption of the benzene as a liquid may be any well known form of apparatus employed for this purpose, such as the separating chambers 8, which may contain activated alumina, and from which the liquid benzene can be drawn off through a pipe 9.

Projecting into the furnace from opposite sides thereof is the hollow carbon electrode 10 and the solid carbon electrode 11, the former electrode being a positive electrode and the latter electrode being a negative electrode. 12 and 13 denote the electrical conductors which are connected to the said electrodes respectively. Each electrode is provided with water cooling means comprising an annular water chamber 14 surrounding the electrode adjacent to the furnace wall, each of the said chambers being provided with a cooling water supply pipe 15. Each electrode is shown as projecting through an opening in a plate 16 secured to the furnace wall 1 and from each of which plates a bracket arm 17 extends outwardly, each bracket arm supporting at its outer end a sleeve 18 through which a threaded rod 19 extends, the said rods being each engaged by an automatic feeding device 20, such as is well known in the industry. These rods are connected to the carbons 10 and 11 and are adapted to maintain constant the distance between the inner ends thereof. Suitable insulation 21 is inserted between each plate 16 and the furnace wall.

The carbon electrode 10 and its operating rod 19 are connected through a housing 22 having at its outboard end a chamber 22$^a$ with the flexible section 23$^a$ of a gas supply pipe 23 having a valve 23$^b$. The inboard or furnace-facing end of this chamber is extended at 22$^b$ to form a tapered split sleeve which may be brought into engagement with the outer end of the carbon electrode 10 by means of a nut 24 having a tapered extension wall 24$^a$ adapted to engage the tapered surface of the sleeve. Insulating material may be inserted between the sleeve and the carbon, as indicated at 25.

Projecting into the top of the furnace is a hollow positive carbon electrode 26 which is mounted and operated in the same manner as the electrode 10, the electrode 26 extending through insulation 27 and the horizontal arm 28 of a bracket, the arm 29 of which is provided with a sleeve 30 through which extends the feeding rod 31 for the carbon 26, the said rod being driven by the automatic feeding device indicated generally at 32. The carbon 26 is supplied with gas through a pipe 33 in the same manner as the carbon 10, delivering the gas into a chamber 34$^a$ at the outboard end of the housing 34, which is connected to the carbon 26 by means of a split tapered extension 34$^a$ of the housing and by the nut 35, 35$^a$.

36 denotes the conductor for supplying electric current to the carbon electrode 26, the said electrode being a positive electrode. The electrode 26 is provided with cooling means similar to those employed with the electrodes 10 and 11 and consisting of an annular circulating chamber 37 and a water supply pipe 38.

Gas supplied through the pipe 23 enters the lower extension of the furnace, where the pipe is formed into a coil 23$^c$, preferably located adjacent to the furnace wall. The upper or delivery end of the coil extends through the furnace wall and to the casing of the valve 23$^b$. 39 denotes any conventional high-frequency apparatus applied to a suitable portion of the pipe 13 and capable of subjecting the gas in this portion of the pipe to the disruptive action of the arc, the said device being provided with the conductors 40 and 41. The high-frequency apparatus may be one of the type manufactured by the General Electric Company and the Westinghouse Electric & Mfg. Company, comprising a chamber through which the gas is conveyed, said chamber containing non-sparking high-frequency coils, whereby an initial dissociation of the gas is instituted, which dissociation is completed by the arc formed between the electrodes. Frequencies of 12,000,000 cycles per second are conventional and may be employed herein. Below the electrodes, shelves 42 project into the furnace from the lining, said shelves containing a catalyst 43, such as platinum black, finely divided nickel, or iron ore, which will increase the yield of benzene.

With the parts constructed and arranged as described, my process will be carried out as follows:—Hydrocarbon fluid will be supplied through the pipe 23 to the bottom of the coil 23c, whereby the fluid is raised to such a temperature as to materially reduce the electric current required for its dissociation within the furnace. In its passage from the coil to the electrode 10, it is subjected to the disruptive action of the high frequency current whereby a partial dissociation of the fluid is produced. When delivered into the interior of the arc formed between the electrodes 10 and 11 or into the region of the arc, further dissociation takes place. When the hydrocarbon fluid is methane or natural gas, it is dissociated in accordance with the reaction $6(CH_4) = C_6H_6 + 18H$.

Notwithstanding the fact that this reaction indicates the liberation of an excess of hydrogen, it has been found that additional hydrogen is necessary in order to insure the production of benzene and also to prevent the destruction of the carbon lining of the furnace. In other words, by introducing hydrogen through the carbon 26 into the region of the arc, hydrogen is always available in sufficient quantity and proportion to insure the production of the benzene and also to prevent or limit the liberation of carbon in excess of that required to produce the benzene. By introducing the hydrocarbon fluid into the interior of the arc between the electrodes 10 and 11 and delivering the hydrogen into the region surrounding the said arc, the fluid is subjected to the action of the arc for an appreciable interval of time before coming into contact with the hydrogen. It is my belief that it is due to the conjoint action of the heat of the arc supplemented by the hydrogen introduced through the electrode 26 that I am enabled to produce from hydrocarbon fluid benzene in such quantities as to render its recovery commercially successful.

The benzene in gaseous form, together with the surplus hydrogen and whatever small proportion of carbon black may have been produced, is delivered through the furnace extension 5, and the gaseous products are delivered thence by the offtake 7 to the separator and absorber shown at 8, 8.

Whatever carbon black may be formed in the practice of my process can be drawn off at the bottom of the furnace, as indicated at 6, and may be conducted through such conventional carbon separators additional thereto as may be desirable or necessary for the recovery of the carbon.

In place of using hydrogen from a separate source of hydrogen supply for the electrode 26, I may employ for this purpose such proportion as may be necessary of the excess gas liberated in the practice of my process. In this event, the gas, which consists essentially of hydrogen, will be conveyed from the separating and absorbing apparatus indicated at 8, 8 through the pipe 44, said pipe having therein a three-way valve 45 by means of which as much of the gas may be directed to the electrode as may be desired, the remainder of the gas being delivered elsewhere through the pipe 46.

The separating and absorbing apparatus 8, 8, as stated hereinbefore, may be of any standard type, one such apparatus being that known to the trade as "Lectrodryer" employing therein activated alumina.

Having thus described my invention, what I claim is:

1. The herein described process of producing benzene which comprises supplying a hydrocarbon fluid continuously through a hollow electrode and through and beyond the arc produced between said electrode and another hollow electrode and a solid electrode in a reaction chamber; continuously supplying a gas containing a large proportion of hydrogen through the other hollow electrode and through and beyond the said arc; and immediately thereafter contacting the products resulting from the action of the arc with a polymerization catalyst immediately adjacent to said arc.

2. The herein described process of manufacturing benzene which comprises supplying a gas consisting principally of methane continuously through and beyond the arc produced between electrodes in a reaction chamber, contacting the resultant gaseous mixture immediately thereafter with a solid polymerization catalyst, with no substantial reduction of the temperature of said mixture, removing carbon and recovering benzene in liquid form from the gases thus produced and de-carbonated, and delivering gaseous products resulting from such separation into the arc, in subsequent cycles of operation.

3. In the process claimed in claim 2, preheating the gas which consists principally of methane and subjecting it to the action of the disruptive discharge of a high frequency current prior to its circulation through and beyond the arc formed between the electrodes in the reaction chamber.

4. The herein described process of producing benzene which comprises supplying a hydrocarbon fluid consisting principally of aliphatic hydrocarbons continuously through an arc produced between electrodes in a reaction chamber thereby to dissociate said fluid; and immediately thereafter contacting the products resulting from the action of the arc with a solid polymerization catalyst immediately adjacent to said arc and with no substantial reduction of the temperature of said mixture.

5. The herein described process of producing benzene which comprises supplying a hydrocarbon fluid consisting principally of aliphatic hydrocarbons continuously through an arc produced between electrodes in a reaction chamber thereby to dissociate said fluid, immediately thereafter contacting the products resulting from the action of the arc with a solid polymerization catalyst immediately adjacent to said arc and with no substantial reduction of the temperature of said mixture, and delivering hydrogen into the arc together with the aforesaid hydrocarbon fluid.

JAMES R. ROSE.